United States Patent
Broussard et al.

(10) Patent No.: US 6,377,177 B1
(45) Date of Patent: Apr. 23, 2002

(54) BABY BLANKET WITH BABY MONITORING SYSTEM

(76) Inventors: Rose Broussard; Johnny Broussard, both of 2229 Cashmere, Port Arthur, TX (US) 77640

( * ) Notice: Subject to any disclaimer, the term of this patent is extended or adjusted under 35 U.S.C. 154(b) by 0 days.

(21) Appl. No.: 09/494,366

(22) Filed: Jan. 31, 2000

(51) Int. Cl.$^7$ ................................................ G08B 23/00
(52) U.S. Cl. ............... 340/573.1; 340/666; 340/309.15; 368/12
(58) Field of Search ................. 340/573.1, 666, 340/667, 523, 529, 309.15, 568.1, 686.6; 368/12

(56) References Cited

U.S. PATENT DOCUMENTS

| | | | |
|---|---|---|---|
| 3,325,799 A | | 6/1967 | Farris |
| 3,631,438 A | | 12/1971 | Lewin |
| 4,245,651 A | | 1/1981 | Frost |
| 4,438,771 A | * | 3/1984 | Friesen et al. ............ 340/573.1 |
| 4,637,732 A | * | 1/1987 | Jones et al. .................... 368/12 |
| 4,853,692 A | * | 8/1989 | Wolk et al. .............. 340/573.1 |
| 4,862,144 A | | 8/1989 | Tao |
| D313,528 S | | 1/1991 | Perdelwitz, Jr. |
| 5,264,824 A | * | 11/1993 | Hour ........................... 340/666 |
| 5,640,145 A | * | 6/1997 | Newham .................. 340/573.1 |
| 5,648,751 A | * | 7/1997 | Yuyama et al. ......... 340/309.15 |
| 5,684,460 A | | 11/1997 | Scanlon |
| 5,764,594 A | * | 6/1998 | Berman et al. ................ 368/12 |
| 5,767,788 A | * | 6/1998 | Ness ........................ 340/568.1 |
| 5,842,141 A | * | 11/1998 | Valhoja et al. ............... 455/574 |
| 5,871,526 A | * | 2/1999 | Gibbs et al. ................. 607/104 |
| 5,912,624 A | * | 6/1999 | Howard, II ............... 340/573.1 |
| 5,914,660 A | * | 6/1999 | Mesibov et al. ......... 340/573.1 |

* cited by examiner

Primary Examiner—John A. Tweel

(57) ABSTRACT

A baby blanket with baby monitoring system for monitoring the weight of a baby. The baby blanket with baby monitoring system includes a blanket that has a weight sensor positioned in an interior of the blanket. The weight sensor is adapted for measuring a weight of an object resting on the blanket. A control unit that has a microcontroller is operationally coupled to the weight sensor. The control unit also has a main audio alarm. The main audio alarm is operationally coupled to the microcontroller. The microcontroller activates the main audio alarm upon the weight sensor sensing a weight outside of a pre-selected range of weight values. In addition, a remote unit can be used to monitor the weight sensor at a distance.

15 Claims, 3 Drawing Sheets

BABY BLANKET WITH BABY MONITORING SYSTEM

BACKGROUND OF THE INVENTION

1. Field of the Invention

The present invention relates to baby monitors and more particularly pertains to a new baby blanket with baby monitoring system for monitoring the weight of a baby resting on the blanket.

2. Description of the Prior Art

The use of baby monitors is known in the prior art. More specifically, baby monitors heretofore devised and utilized are known to consist basically of familiar, expected and obvious structural configurations, notwithstanding the myriad of designs encompassed by the crowded prior art that have been developed for the fulfillment of countless objectives and requirements.

Known prior art includes U.S. Pat. No. 4,245,651; U.S. Pat. No. 4,862,144; U.S. Pat. No. 5,684,460; U.S. Pat. No. 3,631,438; U.S. Pat. No. 3,325,799; and U.S. Pat. No. 313,528.

While these devices fulfill their respective, particular objectives and requirements, the aforementioned patents do not disclose a new baby blanket with baby monitoring system. The inventive device includes a blanket that has a weight sensor positioned in an interior of the blanket. The weight sensor is adapted for measuring a weight of an object resting on the blanket. A control unit that has a microcontroller is operationally coupled to the weight sensor. The control unit also has a main audio alarm. The main audio alarm is operationally coupled to the microcontroller. The microcontroller activates the main audio alarm upon the weight sensor sensing a weight outside of a pre-selected range of weight values. In addition, a remote unit can be used to monitor the weight sensor at a distance.

In these respects, the baby blanket with baby monitoring system according to the present invention substantially departs from the conventional concepts and designs of the prior art, and in so doing provides an apparatus primarily developed for the purpose of monitoring the weight of a baby resting on a blanket.

SUMMARY OF THE INVENTION

In view of the foregoing disadvantages inherent in the known types of baby monitors now present in the prior art, the present invention provides a new baby blanket with baby monitoring system construction wherein the same can be utilized for monitoring the weight of a baby resting on the blanket.

The general purpose of the present invention, which will be described subsequently in greater detail, is to provide a new baby blanket with baby monitoring system apparatus and method which has many of the advantages of the baby monitors mentioned heretofore and many novel features that result in a new baby blanket with baby monitoring system which is not anticipated, rendered obvious, suggested, or even implied by any of the prior art baby monitors, either alone or in any combination thereof.

To attain this, the present invention generally comprises a blanket that has a weight sensor positioned in an interior of the blanket. The weight sensor is adapted for measuring a weight of an object resting on the blanket. A control unit that has a microcontroller is operationally coupled to the weight sensor. The control unit also has a main audio alarm. The main audio alarm is operationally coupled to the microcontroller. The microcontroller activates the main audio alarm upon the weight sensor sensing a weight outside of a pre-selected range of weight values. In addition, a remote unit can be used to monitor the weight sensor at a distance.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new baby blanket with baby monitoring system apparatus and method which has many of the advantages of the baby monitors mentioned heretofore and many novel features that result in a new baby blanket with baby monitoring system which is not anticipated, rendered obvious, suggested, or even implied by any of the prior art baby monitors, either alone or in any combination thereof.

It is another object of the present invention to provide a new baby blanket with baby monitoring system that may be easily and efficiently manufactured and marketed.

It is a further object of the present invention to provide a new baby blanket with baby monitoring system that is of a durable and reliable construction.

An even further object of the present invention is to provide a new baby blanket with baby monitoring system which is susceptible of a low cost of manufacture with regard to both materials and labor, and which accordingly is then susceptible of low prices of sale to the consuming public, thereby making such baby blanket with baby monitoring system economically available to the buying public.

Still yet another object of the present invention is to provide a new baby blanket with baby monitoring system that provides in the apparatuses and methods of the prior art some of the advantages thereof, while simultaneously overcoming some of the disadvantages normally associated therewith.

Still another object of the present invention is to provide a new baby blanket with baby monitoring system for monitoring the weight of a baby resting on the blanket.

Yet another object of the present invention is to provide a new baby blanket with baby monitoring system that includes a blanket that has a weight sensor positioned in an interior of the blanket. The weight sensor is adapted for measuring a weight of an object resting on the blanket. A control unit that has a microcontroller is operationally coupled to the weight sensor. The control unit also has a main audio alarm. The main audio alarm is operationally coupled to the microcontroller. The microcontroller activates the main audio alarm upon the weight sensor sensing a weight outside of a pre-selected range of weight values. In addition, a remote unit can be used to monitor the weight sensor at a distance.

Still yet another object of the present invention is to provide a new baby blanket with baby monitoring system that alerts the user if the baby moves.

Even still another object of the present invention is to provide a new baby blanket with baby monitoring system that alerts the user if the baby is removed from the blanket.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
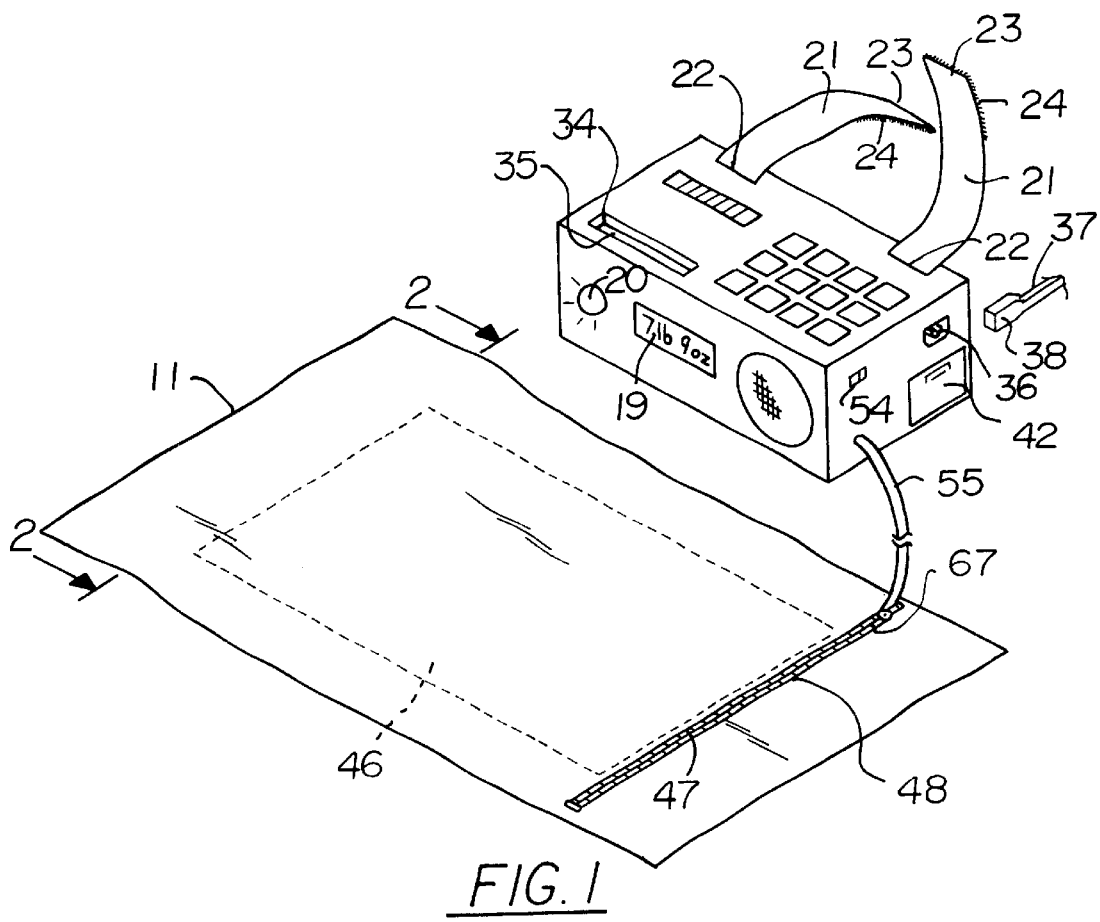
FIG. 1 is a schematic perspective view of a new baby blanket with baby monitoring system according to the present invention.
Figure 2:
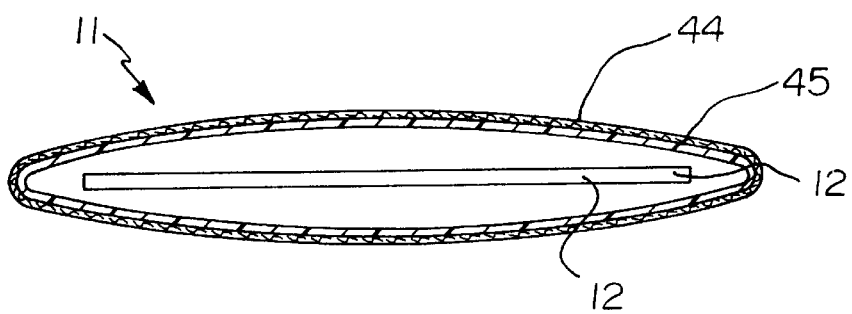
FIG. 2 is a schematic cross-sectional view of the blanket and weight sensor of the present invention.
Figure 3:
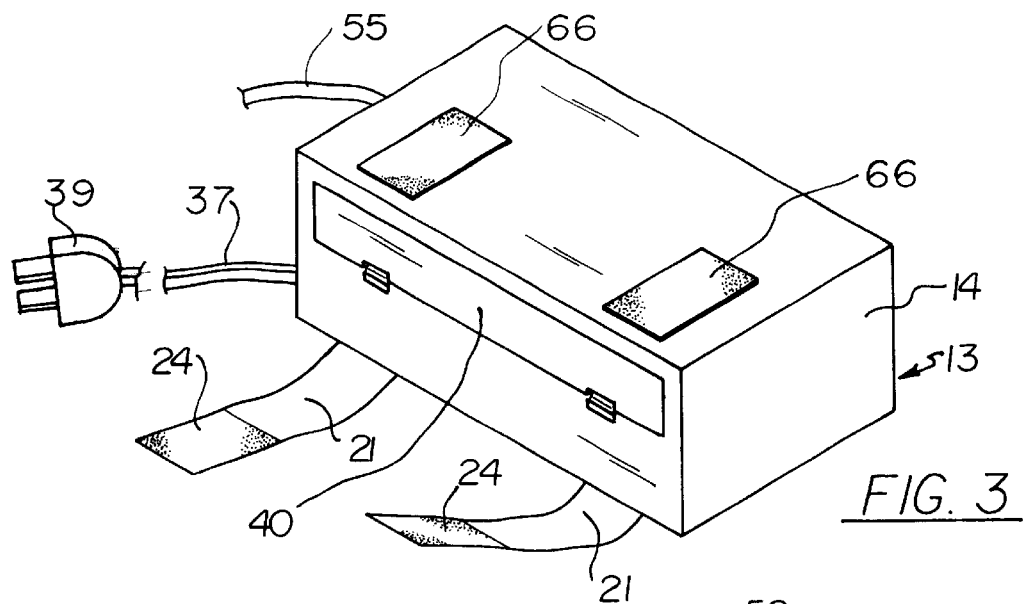
FIG. 3 is a schematic perspective view of the bottom side of the housing of the control unit of the present invention.
Figure 4:
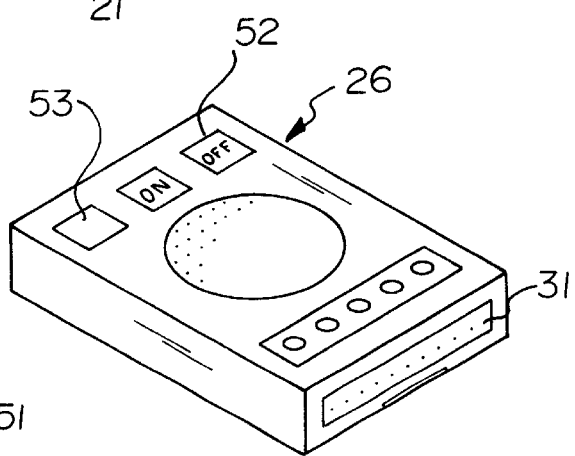
FIG. 4 is a schematic perspective view of the top side of the remote unit of the present invention.
Figure 5:
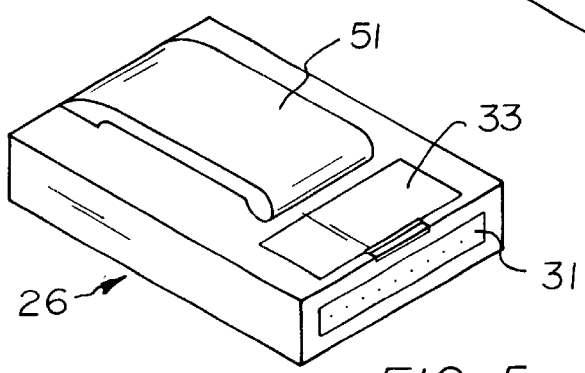
FIG. 5 is a schematic perspective view of the bottom side of the remote unit of the present invention.
Figure 6:
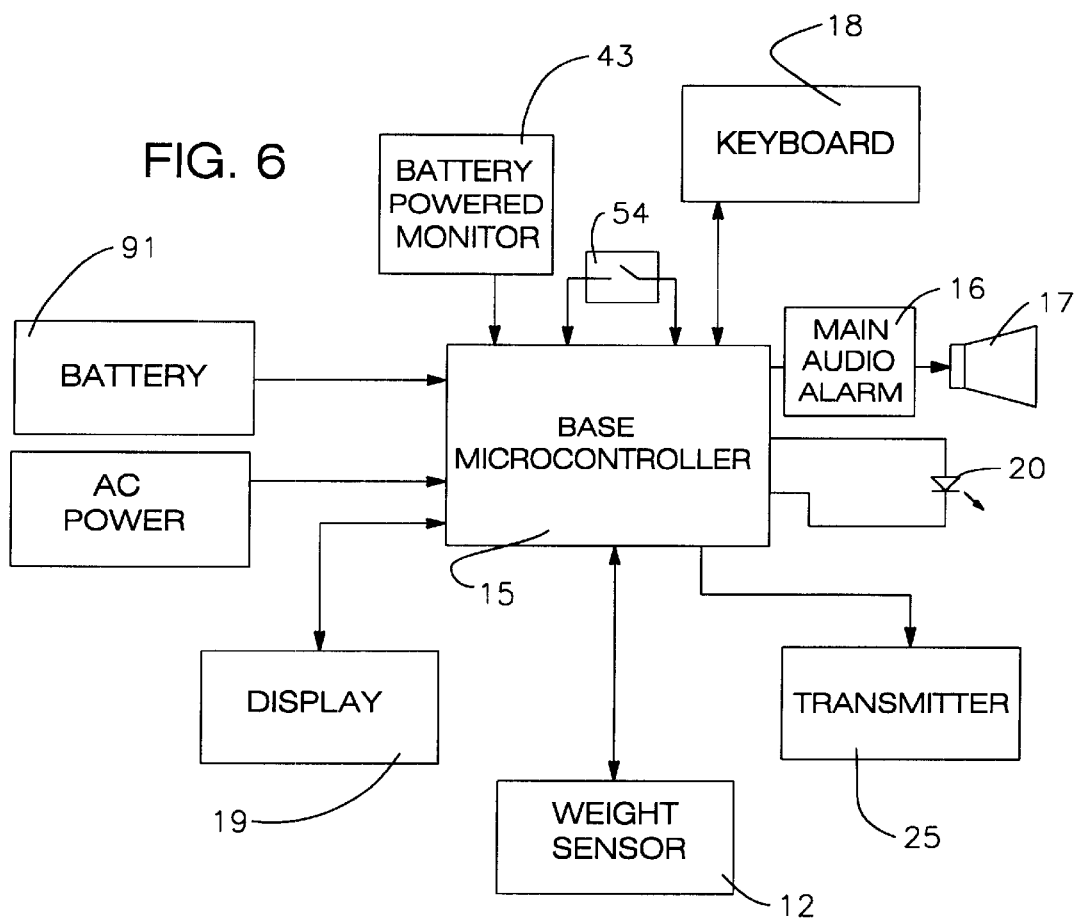
FIG. 6 is a schematic diagram of the electronic components of the control unit of the present invention.
Figure 7:
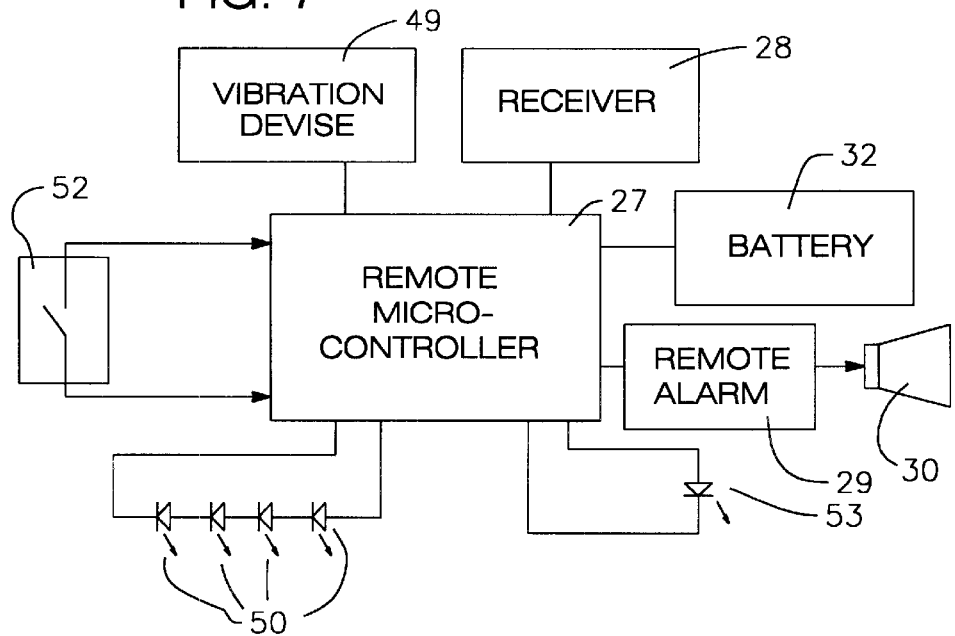
FIG. 7 is a schematic diagram of the electric components of the remote unit of the present invention.

With reference now to the drawings, and in particular to FIGS. 1 through 7 thereof, a new baby blanket with baby monitoring system embodying the principles and concepts of the present invention will be described.

As best illustrated in FIGS. 1 through 7, the baby blanket with baby monitoring system generally comprises a blanket 11 having a weight sensor 12 that is positioned in the interior of the blanket 11. The weight sensor 12 measures the weight of an object resting on the blanket 11.

The baby blanket and baby monitoring system 10 has a control unit 13. A housing 14 encases the control unit 13. The control unit 13 includes a base microcontroller 15. The weight sensor 12 is operationally coupled to the base microcontroller 15 by a connecting cord 55.

The control unit 13 has a main audio alarm 16. The main audio alarm 16 is operationally coupled to the base microcontroller 15. The base microcontroller 15 is adapted to activate the main audio alarm 16 upon the weight sensor 12 sensing a weight outside of a pre-selected range of weight values. The main audio alarm 16 has a main alarm speaker 17 for producing sound when the main audio alarm 16 is activated.

The control unit 13 also includes a keyboard 18. The keyboard 18 is operationally coupled to the base microcontroller 15. The keyboard 18 is designed for inputting a range of weight values. Moreover, the control unit 13 includes a display 19 that is operationally coupled to the base microcontroller 15. The display 19 is designed for displaying a weight sensed by the weight sensor 12.

In addition, the control unit 13 has an on/off indicator light 20 adapted to illuminate when the baby blanket and baby monitoring system 10 is turned on by an on/off switch 54. The indicator light 20 may be a light emitting diode.

A plurality of straps 21 are coupled to the housing 14 of the control unit 13. Each strap 21 has a first end 22 that is coupled to the housing 14 and a second end 23. Moreover, each strap 21 has a hook and loop fastener portion 24 attached proximate its second end 23. An associated hook and loop fastener portion 66 complementary to portion 24 is coupled to the housing 14 of the control unit 13. The hook and loop fastener portion 24 proximate the second end of the straps 21 may be selectively engaged to the hook and loop fastener portion 66 on the housing 14. Thus, the control unit 13 is designed for coupling to a structure. The structure may include a baby bed, a stroller, baby swing or any other structure proximate to where a baby may rest.

A transmitter 25 is operationally coupled to the base microcontroller 15. The transmitter 25 is adapted for sending an activation signal upon the weight sensor 12 sensing a weight outside of the pre-selected range of weight values.

The baby blanket and baby monitoring system 10 also has a remote unit 26 that includes a remote microcontroller 27. A receiver 28 is operationally coupled to the remote microcontroller 27. The remote unit 26 further has a remote alarm 29. The remote microcontroller 27 is adapted for activating the remote alarm 29 upon the receiver 28 receiving an activation signal from the transmitter 25. The remote alarm 29 has a remote speaker 30 that produces sound when the remote alarm 29 is activated.

The remote unit 26 has a plurality of remote contacts 3 1 on its exterior surface. The remote contacts 31 are in electrical communication with a rechargeable remote battery 32 in the remote unit 26. The rechargeable remote battery 32 is positioned in a battery compartment 33 in the remote unit 26.

The control unit 13 includes a charging port 34. The charging port 34 has base contacts 35 positioned for abutting the remote contacts 31 when the remote unit 26 is inserted into the charging port 34. When the remote unit 26 is inserted in the charging port 34 the rechargeable remote battery 32 is charged.

The control unit 13 includes an AC cord port 36 and an AC cord 37. The AC cord 37 has a first end 38 that is complementary to the AC cord port 36. In addition, the AC cord 37 has a second end 39 that is designed for being inserted into an electrical outlet for providing electrical power to said control unit 13. In addition, the control unit 13 has a compartment 40 for storing the AC cord 37 when the AC cord 37 is not in use.

A battery 41 is positioned in a battery compartment 42 of the housing 14 of the control unit 13. The battery provides power to the control unit 13 when the control unit 13 cannot be plugged into an electrical outlet. Moreover, the control unit 13 includes a battery power monitor 43 for providing a visual indication of the power of the battery in the control unit 13.

The blanket 11 has a flannel exterior layer 44, a plastic interior layer 45 and a pocket 46 therein for receiving the weight sensor 12. The blanket 11 has an opening 47 into the pocket 46 for facilitating insertion and removal of the weight sensor 12 from the blanket 11. In addition, the blanket 11 includes a closure mechanism 48 for selectively closing the opening. In an embodiment, the closure mechanism 48 is a zipper 67. The closure mechanism 48 holds the weight sensor 12 within the blanket 11 when the weight sensor 12 is positioned in the pocket 46 and the closure mechanism 48 is in a closed orientation.

The remote unit 26 has a vibratory mechanism 49. The vibratory mechanism 49 is operationally coupled to the remote microcontroller 27. The vibratory mechanism 49 is adapted to vibrate when the receiver 28 receives an activation signal from the transmitter 25.

The remote unit 26 has a plurality of activation lights 50. In an embodiment, the activation lights 50 are light emitting diodes. The activation lights 50 are operationally coupled to the remote microcontroller 27. The activation lights 50 are designed to illuminate upon the receiver 28 receiving an activation signal from the transmitter 25. In an embodiment, the plurality of activation lights 50 are programmed to flash on and off in a variety of different configurations.

The remote unit 26 has a clip member 51 that is designed for facilitating attachment of the remote unit 26 to an article of clothing. The remote unit 26 also includes on and off switches 52 for selectively activating and deactivating the remote unit 26. In addition, the remote unit 26 has a low battery indicator light 53 that is designed to dim when the rechargeable remote battery 32 in the remote unit 26 is low. In an embodiment, the low battery indicator light 53 is a light emitting diode.

In use, the user places a baby on the blanket 11. The user then turns the control unit 13 on and programs in the desired parameters of weight values with the keyboard 18. The remote unit 26 is then turned on and kept on or near the user. If the weight sensor 12 senses a weight value outside the parameters set by the user, the remote unit 26 will vibrate, the plurality of activation lights 50 will illuminate and the remote speaker 30 will make a sound, thereby alerting the user of the situation. In addition, the main alarm speaker 17, in the control unit, will also produce a sound if the weight sensor 12 senses a weight value outside the parameters set by the user.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A baby blanket and baby monitoring system comprising:

a blanket having a weight sensor positioned in an interior of said blanket adapted for measuring a weight of an object resting on said blanket;

a control unit having a housing and a base microcontroller positioned in said housing, said weight sensor being operationally coupled to said base microcontroller;

said control unit including a keyboard, said keyboard being operationally coupled to said base microcontroller for inputting desired parameter weight values for determining said pre-selected range of weight values;

said control unit including a main audio alarm, said main audio alarm being operationally coupled to said base microcontroller; and wherein said base microcontroller activates said main audio alarm upon said weight sensor sensing a weight outside of said pre-selected range of weight values;

a plurality of straps coupled to said housing of said control unit, each strap having a first end coupled to said housing, each strap having a first portion of a hook and loop fastener coupled to a distal end of said strap;

said housing having at least one second portion of said hook and loop fastener coupled to an exterior surface of said housing, said second portion of said hook and loop fastener being complimentary to said first portion of said hook and loop fastener whereby said distal ends of said straps are selectively engageable to said housing such that said control unit is adapted for coupling to a structure.

2. The baby blanket and baby monitoring system of claim 1, further comprising:

said control unit including a display operationally coupled to said base microcontroller for displaying a weight sensed by said weight sensor.

3. The baby blanket and baby monitoring system of claim 1, further comprising:

a transmitter operationally coupled to said base microcontroller for sending an activation signal upon said weight sensor sensing said weight outside of the pre-selected range of weight values;

a remote unit having a remote microcontroller and a receiver operationally coupled to said remote microcontroller, said remote unit further having a remote alarm, said remote microcontroller being for activating said remote alarm upon said receiver receiving said activation signal from said transmitter.

4. The baby blanket and baby monitoring system of claim 3, further comprising:

said remote unit having a plurality of remote contacts on an exterior surface of said remote unit, said contacts being in electrical communication with a rechargeable remote battery in said remote unit; and said control unit including a charging port having base contacts positioned for abutting said remote contacts when said remote unit is inserted into said charging port whereby said battery of said remote unit is chargeable by inserting said remote unit into said charging port.

5. The baby blanket and baby monitoring system of claim 1, further comprising:
said control unit including having an AC cord port;
an AC cord having a first end complementary to said AC cord port and a second end adapted for insertion into an electrical outlet for providing electrical power to said control unit.

6. The baby blanket and baby monitoring system of claim 5, further comprising:
said control unit having a compartment for storing said AC cord when said AC cord is not in use.

7. The baby blanket and baby monitoring system of claim 1, further comprising:
a battery positioned in a battery compartment of said housing of said control unit for providing power to said control unit.

8. The baby blanket and baby monitoring system of claim 1, further comprising:
said blanket having a flannel exterior layer, a plastic interior layer and a pocket therein for receiving said weight sensor.

9. The baby blanket and baby monitoring system of claim 8, further comprising:
said blanket having an opening into said pocket for facilitating insertion and removal of said weight sensor from said blanket; and
a closure mechanism for selectively closing said opening whereby said weight sensor is held within said blanket when said weight sensor is positioned in said pocket and said closure mechanism is in a closed orientation.

10. The baby blanket and baby monitoring system of claims 3, further comprising:
said remote unit having a vibratory mechanism, said vibratory mechanism being operationally coupled to said remote microcontroller such that said vibratory mechanism is activated upon said receiver receiving said activation signal from said transmitter.

11. The baby blanket and baby monitoring system of claim 3, further comprising:
said remote unit having a plurality of lights, said lights being operationally coupled to said remote microcontroller such that said lights are illuminated upon said receiver receiving said activation signal from said transmitter.

12. The baby blanket and baby monitoring system of claim 3, further comprising:
said remote unit including a clip member adapted for facilitating attachment of said remote unit to an article of clothing.

13. The baby blanket and baby monitoring system of claim 3, further comprising:
said remote unit including on and off switches for selectively activating and deactivating said remote unit.

14. The baby blanket and baby monitoring system of claim 7, further comprising:
said control unit including a battery power monitor for providing an visual indication of the power of the battery in said control unit.

15. A baby blanket and baby monitoring system comprising:
a blanket having a weight sensor positioned in an interior of said blanket adapted for measuring a weight of an object resting on said blanket;
a control unit having a housing and a base microcontroller positioned in said housing, said weight sensor being operationally coupled to said base microcontroller;
said control unit including a main audio alarms said main audio alarm being operationally coupled to said base microcontroller whereby said base microcontroller activates said main audio alarm upon said weight sensor sensing a weight outside of a pre-selected range of weight values;
said control unit including a keyboard, said keyboard being operationally coupled to said base microcontroller for inputting desired parameter weight values for determining said pre-selected range of weight values;
said control unit including a display operationally coupled to said base microcontroller for displaying a weight sensed by said weight sensor;
a plurality of straps coupled to said housing of said control unit, each strap having a first end coupled to said housing, each strap having a first portion of a hook and loop fastener coupled to a distal end of said strap;
said housing having at least one second portion of said hook and loop fastener coupled to an exterior surface of said housing, said second portion of said hook and loop fastener being complimentary to said first portion of said book and loop fastener whereby said distal ends of said straps are selectively engageable to said housing such that said control unit is adapted for coupling to a structure;
a transmitter operationally coupled to said base microcontroller for sending an activation signal upon said weight sensor sensing said weight outside of the pre-selected range of weight values;
a remote unit having a remote microcontroller and a receiver operationally coupled to said remote microcontroller, said remote unit further having a remote alarm, said remote microcontroller being for activating said remote alarm upon said receiver receiving said activation signal from said transmitter;
said remote unit having a plurality of remote contacts on an exterior surface of said remote unit, said contacts being in electrical communication with a rechargeable remote battery in said remote unit;
said control unit including a charging port having base contacts positioned for abutting said remote contacts when said remote unit is inserted into said charging port whereby said battery of said remote unit is chargeable by inserting said remote unit into said charging port;
said control unit including having an AC cord port;
an AC cord having a first end complementary to said AC cord port and a second end adapted for insertion into an electrical outlet for providing electrical power to said control unit;
said control unit having a compartment for storing said AC cord when said AC cord is not in use;
a battery positioned in a battery compartment of said housing of said control unit for providing power to said control unit;
said blanket having a flannel exterior layer, a plastic interior layer and a pocket therein for receiving said weight sensor;
said blanket having an opening into said pocket for facilitating insertion and removal of said weight sensor from said blanket;

a closure mechanism for selectively closing said opening whereby said weight sensor is held within said blanked when said weight sensor is positioned in said pocket and said closure mechanism is in a closed orientation;

said remote unit having a vibratory mechanism, said vibratory mechanism being operationally coupled to said remote microcontroller such that said vibratory mechanism is activated upon said receiver receiving said activation signal from said transmitter;

said remote unit having a plurality of lightest said lights being operationally coupled to said remote microcontroller such that said lights are illuminated upon said receiver receiving said activation signal from said transmitter;

said remote unit including a clip member adapted for facilitating attachment of said remote unit to an article of clothing;

said remote unit including on and off switches for selectively activating and deactivating said remote unit; and said control unit including a battery power monitor for providing an visual indication of the power of the battery in said control unit.

* * * * *